United States Patent [19]

Ogata et al.

[11] Patent Number: 4,827,349
[45] Date of Patent: May 2, 1989

[54] COMMUNICATION TERMINAL DEVICE

[75] Inventors: Minoru Ogata, Yokohama; Takashi Takeda, Higashimurayama; Hideo Kuo, Machida; Tamotsu Nakazawa, Yokohama; Shintaro Abe, Fujisawa, all of Japan

[73] Assignee: Canon Kabushiki Kaisha, Tokyo, Japan

[21] Appl. No.: 855,704

[22] Filed: Apr. 25, 1986

[30] Foreign Application Priority Data

| Apr. 30, 1985 | [JP] | Japan | 60-93337 |
| Apr. 30, 1985 | [JP] | Japan | 60-93338 |
| Apr. 30, 1985 | [JP] | Japan | 60-93339 |
| Apr. 30, 1985 | [JP] | Japan | 60-93340 |
| Apr. 30, 1985 | [JP] | Japan | 60-93341 |
| Apr. 30, 1985 | [JP] | Japan | 60-93342 |
| May 3, 1985 | [JP] | Japan | 60-94789 |
| May 3, 1985 | [JP] | Japan | 60-94790 |

[51] Int. Cl.⁴ .................... H04M 1/00; H04M 1/32
[52] U.S. Cl. ................... 358/256; 358/257; 358/280
[58] Field of Search ............ 358/280, 288, 257, 274, 358/275, 256; 379/100, 53, 215

[56] References Cited

U.S. PATENT DOCUMENTS

| 4,317,136 | 2/1982 | Keyt et al. | 358/256 |
| 4,494,149 | 1/1985 | Furukawa | 358/257 |
| 4,568,983 | 2/1986 | Bobick | 358/263 |
| 4,571,634 | 2/1986 | Cameschi et al. | 358/261 |
| 4,583,124 | 4/1986 | Tsuji et al. | 358/257 |
| 4,642,697 | 2/1987 | Wada | 358/257 |
| 4,672,459 | 6/1987 | Kudo | 358/257 |

FOREIGN PATENT DOCUMENTS 2169172 7/1986 United Kingdom .............. 379/215

Primary Examiner—Edward L. Coles, Sr.
Attorney, Agent, or Firm—Fitzpatrick, Cella, Harper & Scinto

[57] ABSTRACT

A communication terminal device has a memory for storing data to be transmitted, means for sending out the data stored in the memory to a line for transmission to a receiving station, and a control for converting a portion of the data from the memory so that the converted data are compatible with the type of the receiving terminal.

16 Claims, 15 Drawing Sheets

FIG. 11
| TERMINAL NO. | DENSITY (PEL/mm) |
|---|---|
| 0 0 0 1 | 8 |
| 0 0 0 2 | 16 |
| | |
FIG. 12A
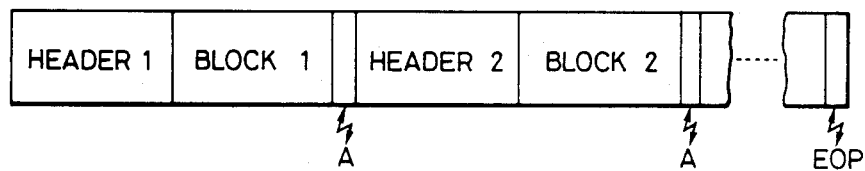
FIG. 12B
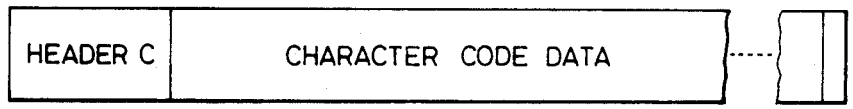
FIG. 12C
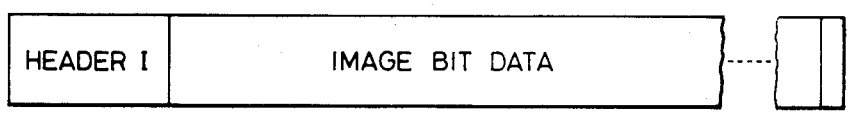

COMMUNICATION TERMINAL DEVICE

BACKGROUND OF THE INVENTION

1. Field of the Invention

The present invention relates to a communication terminal device or system such as a facsimile or teletex machine.

2. Related Background Art

In a prior art facsimile machine, when data sent through a line is to be received, it is temporarily stored in a RAM (random access memory) and a printer prints out the data on a record paper in accordance with the data stored in the RAM. When data is to be transmitted, a text is read by a reader the read data is temporarily stored in the RAM, and a signal is sent to the line in accordance with the data stored in the RAM. In the receiving and transmitting operations, the data is compressed and decompressed.

Since the RAM has the shortcoming that the memory content is destroyed when the power supply is turned off, use of a non-volatile memory such as a hard disk instead of the RAM has been proposed.

In this case, if there is an error between the non-volatile memory and a communication control unit (CCU) during the receiving operation, the data is not correctly stored in the non-volatile memory even if the data is correctly received. As a result, the received text cannot be correctly printed out. A sending station may not know when such an error occurs. In this case, the reliability of the received text is lowered. From the viewpoint of the sending station, it leads to reduction of reliability of transmitting text.

The facsimile machine is classified into class 1 machines, which can send and receive only image data, class 2 machines, which can send and receive image data and can only receive character code data, and class 3 machines, which can send and receive image data and character code data. The class 3 machine can efficiently transmit a document in which character code data and image data are mixedly contained.

The class 3 machine (mixed mode terminal) cannot send character code data to a class 1 machine. Further, the mixed mode terminal cannot send image data to a teletex machine.

It may be possible to connect a display means such as a CRT to the facsimile machine to display the received image data on the CRT. It may also be possible to edit images and characters to be sent on the CRT. If data is receiving during the editing, an indicator such as a lamp may be turned on to notify the operator of the reception of the data.

In this case, the indicator is required separately from the CRT and the number of parts required increases.

When the non-volatile memory is connected to the communication terminal device, all power supplies are kept on in order to allow automatic reception. This wastes power. Further, since the hard disk is rotated for a long time, the lifetime of the hard disk is shortened. In order to overcome the above shortcomings, the power supply of the terminal may be kept off until data is received, when the power supply is turned off. In this case, however, a certain time is required before the facsimile machine starts, and the line has to wait for the start-up.

Where a reader of one station is of high resolution and a printer of another station is of low resolution, a long transmission time is needed if the high density data read by the reader is transmitted as it is and the other station converts the density of the received data.

SUMMARY OF THE INVENTION

It is an object of the present invention to provide a communication terminal device which overcomes the problems described above.

It is another object of the present invention to provide a mixed mode terminal device which can communicate with a station which can receive only a selected type of data.

It is another object of the present invention to provide a mixed mode terminal device which can send character information to a facsimile machine which can receive image data but cannot receive character code data.

It is another object of the present invention to provide a facsimile machine having a high reliability to transmitting text.

It is still another object of the present invention to provide a facsimile machine having a high reliability to received text.

It is still another object of the present invention to provide a communication terminal device which does not unnecessarily tie up a line.

It is yet another object of the present invention to provide a communication terminal device which can detect reception of data from a line during editing of an image and text on a display screen.

It is another object of the present invention to provide a mixed mode communication terminal device which can reduce a transmission time when data is sent from one station capable of processing high density data to another station capable of processing low density data.

It is still another object of the present invention to provide a communicaion terminal device which determines a transmission mode in accordance with the type of communicating station and the type of information to be transmitted.

It is another object of the present invention to provide a communicaion terminal device which converts a portion of data and transmits it.

It is another object of the present invention to provide a communication terminal device which reliably transmits and receives mixed data.

These and other objects, features and advantages of the present invention will be more fully apparent from the following description of the preferred embodiments of the present invention, taken in conjunction with the accompanying drawings.

BRIEF DESCRIPTION OF THE DRAWINGS

FIG. 11 shows a data map which indicates a relationship between a terminal number of a communicating station and a density data, FIGS. 12A, 12B and 12C are data block diagrams.

DESCRIPTION OF THE PREFERRED EMBODIMENTS

Figure 1:
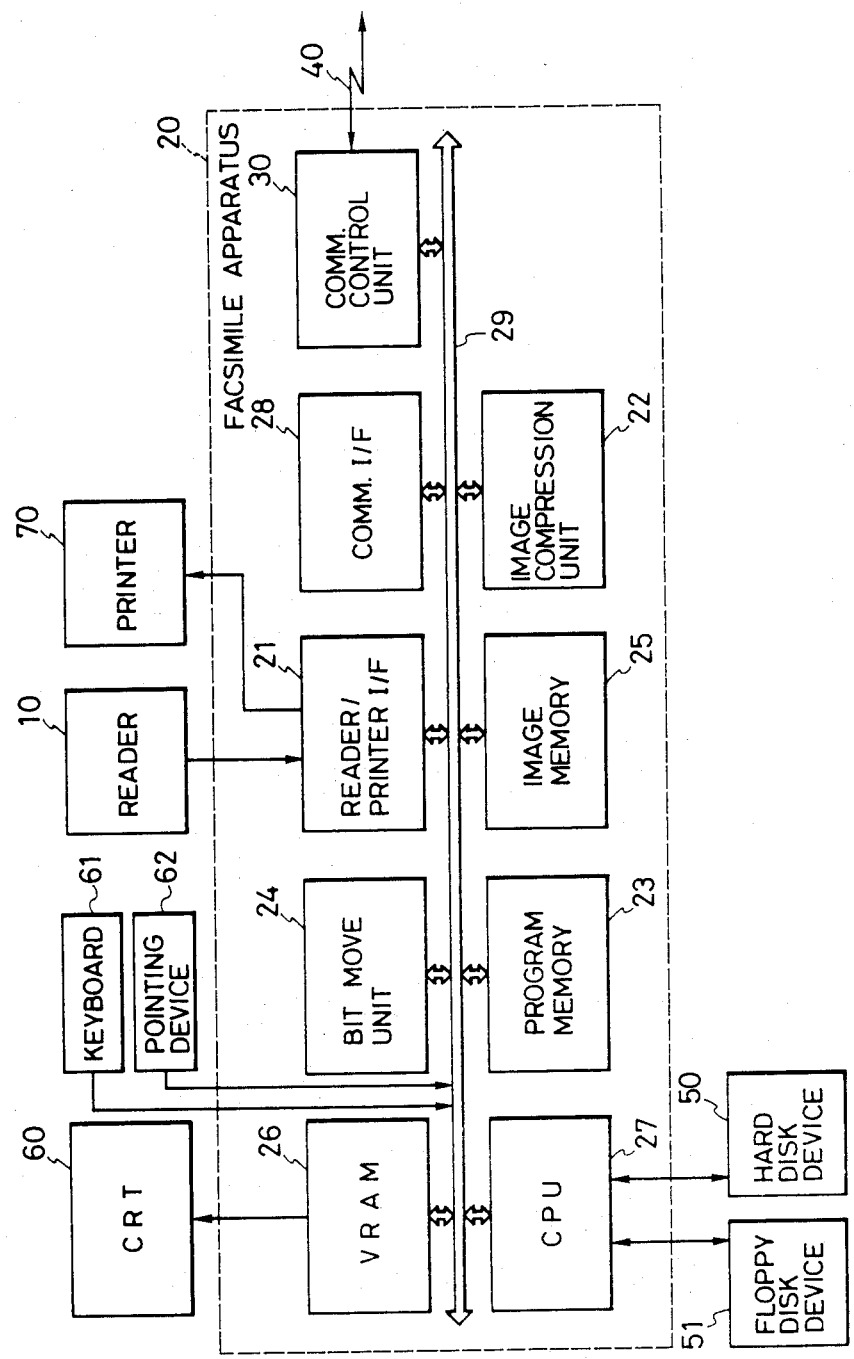
FIG. 1 is a block diagram of one embodiment of the present invention.
Figure 2:
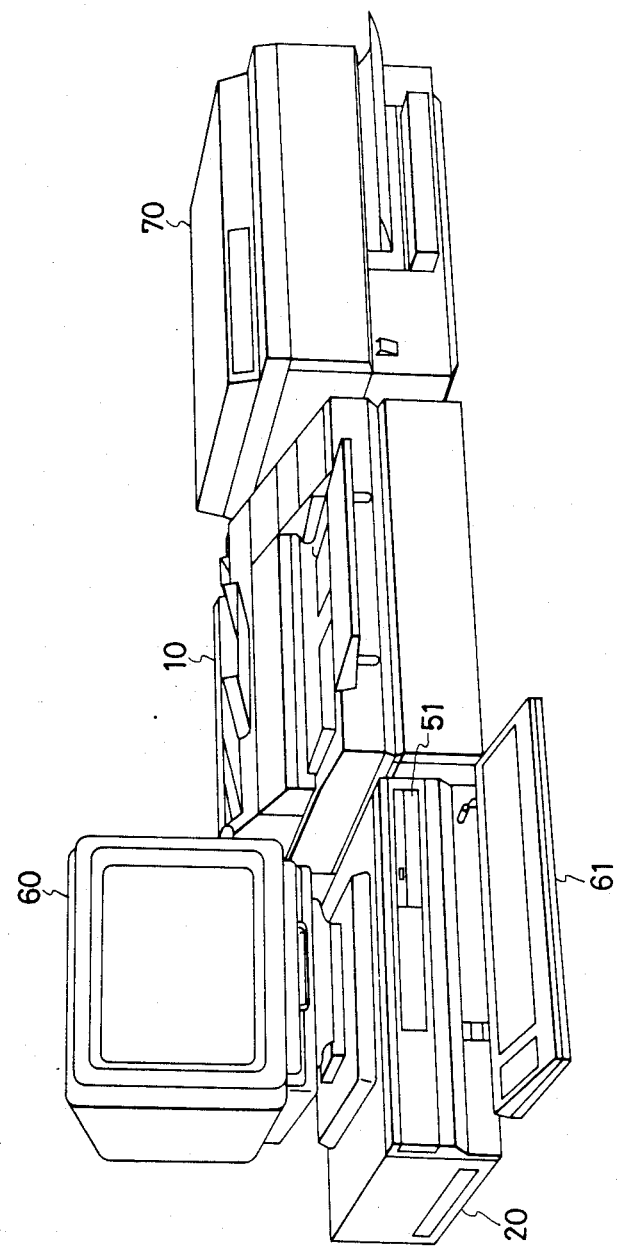
FIG. 2 is a perspective view of the embodiment of FIG. 1

FIG. 1 is a block diagram of one embodiment of the present invention, and FIG. 2 is a perspective view of that embodiment.

A reader 10 reads a document to produce an electrical signal. A facsimile machine 20 comprises a reader/printer interface 21, an image compression unit (ICU) 22, a program memory (PMEM) 23, a bit move unit (BMU) 24, an image memory (IMEM) 25, a video RAM (VRAM) 26, a central processing unit (CPU) 27, a communication interface 28, a bus 29 and a communication control unit (CCU) 30.

The ICU compresses and decompresses data. In order to raise an encoding rate, a two-dimensional compression (high compression) is used. The PMEM 23 includes an OS program area and an application program area for controlling input/output devices on a periphery of the facsimile machine 20 and units in the facsimile machine, and a font memory area for converting character code data to image bit data. It also includes an area for storing and editing test code data (character data) by key entry or word processing. The PMEM 23 has a memory management unit (MMEU) and a work area which serves as a buffer for transmission data for transmitting data from a hard disk 50 through the CCU 30 and writing data from the CCU 30 to the hard disk 50. The buffer is used for velocity adjustment between the disk and the line.

The BMU 24 processes data bit by bit in the CRT 60 to edit an image (image processing) such as by enlarging, reducing, rotating, moving or extracting of the image.

The IMEM 25 has a 4M-bytes capacity to store the image data from the reader, the image data edited by the BMU 24, the data decompressed by the ICU 22 and the image bit data (for example, one bit per pixel) of the key-entered character data, word-processed text code data, mixed data or character code data. The mixed data contains the image bit data and the character code data in one page. Each block is called an image block or a character block. Each block has its own identification code and is managed and stored. The IMEM 25 may also be used as a buffer which temporarily stores data for adjusting velocity between the reader 10, printer 70 and the line 40.

The VRAM 26 stores the image data to be displayed on the CRT 60 in the form of bit map data (for example, one bit per pixel).

The hard disk device 50 and the floppy disk device 51 are provided as external storages. Those devices are non-volatile memories. A backup memory may be used as a non-volatile memory. The transmission data and the received data are stored therein.

The keyboard 61 enters transmission/reception command data, image/word process command data and character data for word processing.

The pointing device 62 such as a mouse moves a cursor position on the CRT 60 to select an image position to be edited. The point device 62 also divides the mixed data into blocks. The block coordinates are stored in the PMEM 23 and are used as identification code data (header) during the transmission.

The line 40 is preferably a digital line of 64K bits/sec of a digital data switching network or digital data packet network for transmitting high resolution (density) and large information quantity image data at a high speed.

The printer 70 is a laser beam printer which prints at a speed of 3Mbps.

Figure 7:
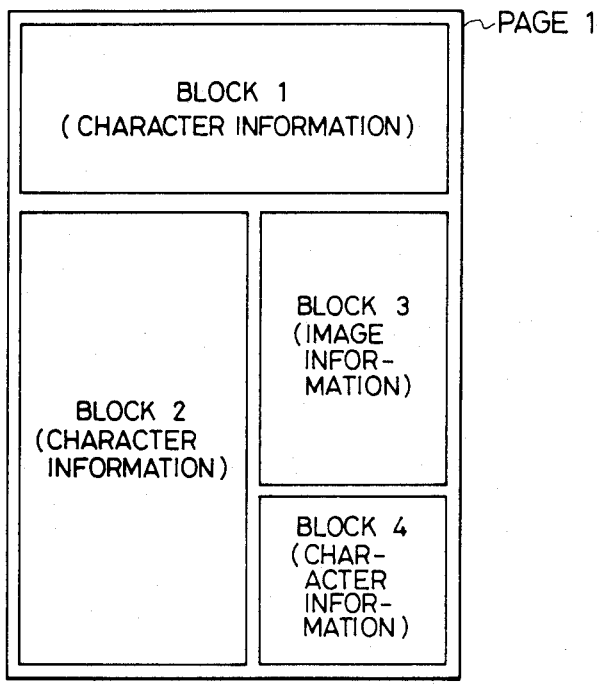
FIG. 7 shows a plurality of blocks of a mixed mode.

In FIG. 7, one page of mixed data is divided into blocks 1-4. The one page of data corresponds to one screen on the CRT 60, one page of transmission data and one page of print sheet for the received data. A plurality of such page data are prepared and stored in the hard disk 50, and they are parallelly transmitted. In a transmission format of the mixed data shown in FIG. 12, structure data (headers) 1-n are added before the block data 1-n. The header indicates whether the succeeding block data is image data or character data, size (data quantity) of the block data and position on the page. Symbol A denotes a transmission/reception acknowledgment signal for the block data after the transmission of one page of data, EOP is sent.

The one page of data from the reader 10 is stored in the image memory 25, transferred to the VRAM 26 and displayed on the CRT 60. The image is trimmed through the BMU 24 by command from the keyboard 61 or the pointing device 62 so that only the image corresponding to the block 3 is left, which is then stored in the memory 25.

The text code data from the key 61 is stored in the memory 23, bit-converted, transferred to the VRAM 26 and displayed on the CRT 60. The data is edited in the same manner as the image processing so that text characters corresponding to the blocks 1, 2 and 4 are left, which are then stored in the memory 23. The data stored in the memory 23 are codes. The position data corresponding to the respective blocks and the data types are managed by the memory 23. Upon the next command, the image data and the position data of the block 3 in the memory 25 are read out and displayed on the CRT 60 at the position of the block 3 through the VRAM 26. Thus, the blocks 1-4 of FIG. 7 are finally displayed. The mixed data are read from the memories 23 and 25 in the sequence of blocks 1-4 and sequentially stored in the disk 50.

The transmission operation is now explained.

The document is read by the reader 10 and the image data is stored in the IMEM 25 through the reader/printer interface 21 and stored in the hard disk. In the transmission operation, the image data is compressed to an MMR code by the ICU 22 and the code is stored in the disk. The data stored in the hard disk is temporarily stored in the PMEM 23 from which it is sent to a destination station through the CCU 30 and the line 40.

In order to edit the data stored in the hard disk 50, the data is read into the IMEM 25, decompressed by the ICU 22 and the image enlargement/reduction and movement are carried out by the BMU 24. If characters are to be entered during the edition, the characters are entered from the keyboard 61 and converted to character data by the PMEM 23, and they (or the character data stored in the hard disk) are stored in the character block of the image edited by the BMU 24. In order to transmit the edited data, it is stored in the hard disk 50, written into the PMEM 23 and then read therefrom and sent to a destination station through the CCU 30 and the line 40. The data of FIG. 7 edited on the CRT 60 is transmitted in a similar manner.

In order to print out the edited data, it is written into the IMEM 25 and then read therefrom and developed into the image dot data, which is sent to the printer 70 through the reader/printer interface 28. In order to display the edited data on the CRT 60, it is written into the VRAM 26 and then read therefrom and sent to the CRT 60.

Figure 3:
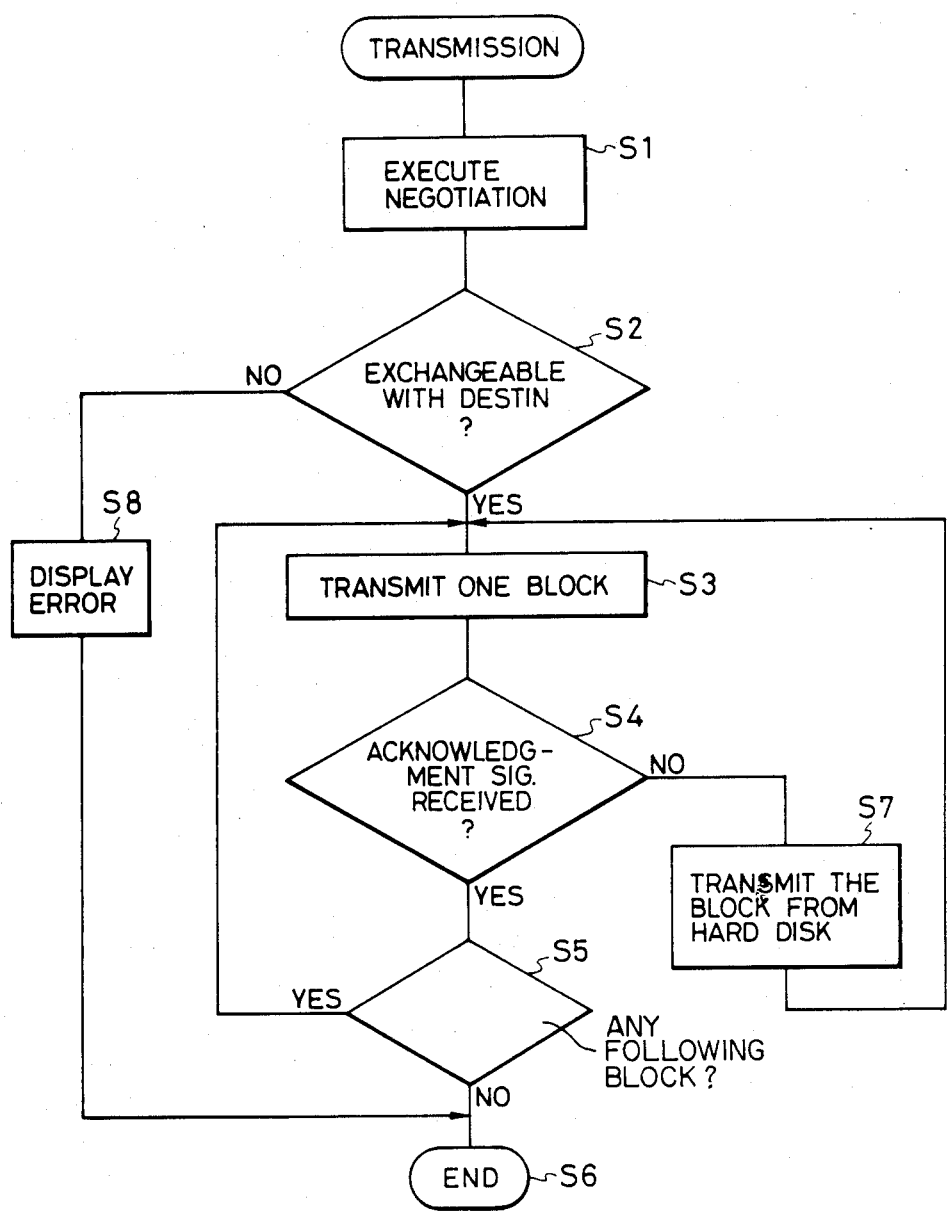
FIG. 3 is a flow chart of a send operation in the embodiment of FIG. 1

The operation of the present embodiment is explained. FIG. 3 shows a flow chart of the transmission operation in the present embodiment. The flow chart operation is executed by the CPU 27 in accordance with a program stored in the PMEM 23.

A negotiation (protocol data communication) with a destination station is started (S1) to determine whether the communication with the destination station is allowed or not (S2). If it is allowed, one block of the transmission data is sent out from the hard disk 50 through the memory 23 and the CCU 30 (S3). Reception of an acknowledgment signal for the one block from the destination station is checked (S4). Prior to the step S1, the binary image data or mixed data from the reader 10 is stored in the hard disk 50 for transmission.

If the acknowledgment signal is detected, whether another black remain to be transmitted or not is checked (S5). If another is to be sent the process returns to the step S3 and the above operation is repeated until the last block is transmitted (S6).

If the acknowledgment signal is not received from the destination station after the transmission of one block (S3), the data of the block corresponding to the unreceived acknowledgment signal is sent from the hard disk 50 (S7). That is, the data of that block is retransmitted. Thus, the reliability of the transmission data is improved.

In the step S3, if the communication with the destination station is not allowed due to a trouble such as a line break or mismatching of communication mode, an error message or indication is displayed (S8) and the transmission operation is terminated (S6).

Figure 4:
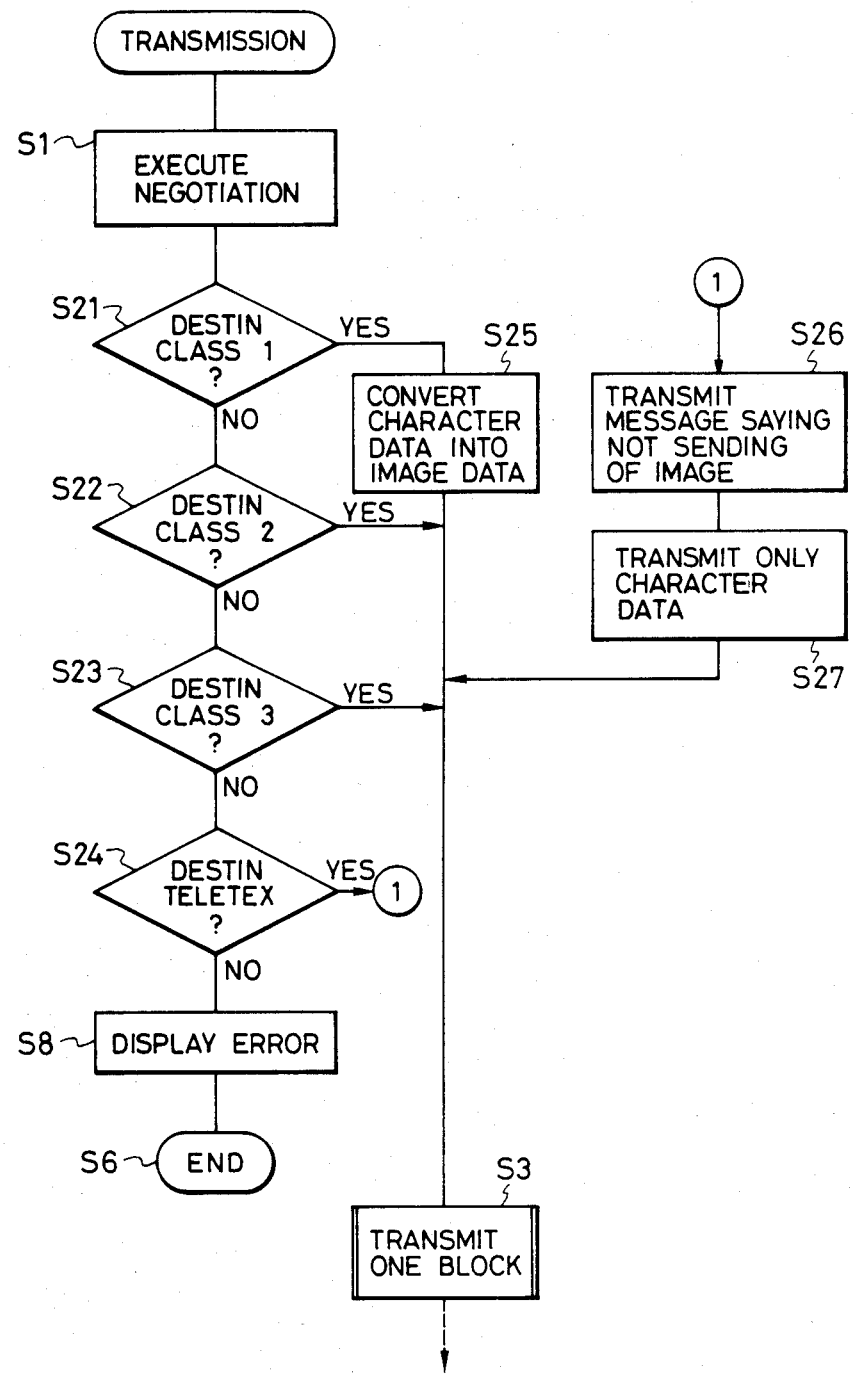
FIG. 4 is a flow chart of another send operation in the embodiment of FIG. 1

FIG. 4 shows a flow chart of a modification of the transmission operation shown in FIG. 3. Let us assume that the transmitting station is a mixed mode terminal device. In the mixed mode, the pixel data (MMR code data) of the image and the character data (ASCII code data) can be transmitted and received, and the text including the characters and the images in one page can be efficiently transmitted. The like steps to those shown in FIG. 3 are designated by the like step numbers.

In the embodiment shown in FIG. 4, the transmission data is converted to a signal format which can be received by the destination station, before being transmitted.

After the negotiation has been started (S1), whether the destination station is a class 1 station (which can transmit and receive only the image data) or not is determined by the protocol data (S21). If it is a class 1 station, the character code data is converted to image data by the PMEM 23, the image data is compressed by the ICU 22 (S25), and it is transmitted one page at a time for each block (S3). The conversion is carried out by a character generator in the PMEM 23 which produces a bit pattern signal corresponding to the character data. The steps after the step S3 are identical to those in FIG. 3.

If the destination station is not a class 1 station, whether the destination station is a class 2 station (which can transmit and receive image data and can only receive character data and mixed data) or a class 3 station (which can transmit and receive image data and character data and transmits data in the mixed mode in which a document containing characters and images in one page can be efficiently transmitted) is checked (S22, S23). If it is the class 2 or 3 station, the process goes to the step S3 where the data is transmitted block by block.

If the destination station is none of the classes 1 to 3, whether the destination station is a teletex station (word processing communication terminal) or not is checked (S24). If it is a teletex station, the sending station sends an ASCII code message stating that it will not send the image (S26) and then it sends only the character data block (S27). The character data are sent one page per block. The teletex station can display the block of text on the screen of the CRT 60 and can also display the above message.

Thus, a plurality of blicks are printed on the plurality of pages. In the class 2, 3 terminals, one page of data sent in a plurality of blocks is edited to display or print 14 on one page. In the class 1 terminal and the teletex terminal, the block editing cannot be carried out and each block is printed on one page. An embodiment in which a plurality of blocks are printed on one page will be explained later.

In this manner, the mixed mode terminal device can communicate with the destination station which can transmit and receive only the image data, and can communicate with a teletex station. When it communicates with a teletex station, it sends the message stating that it is not sending the image data. Thus, the destination station does not determine that an error has occurred even though it does not receive the image data.

In the embodiment of FIG. 4, when the destination station is a teletex station, the message stating that the image data is not being sent may be sent after the transmission of the character data (or during the transmission of the character data).

In the embodiments of FIGS. 3 and 4, the reception of the acknowledgment signal is checked for each block. Alternatively, the reception of the acknowledgment signal may be checked for each window comprising a plurality of blocks or for each page of the document. Only error pages or error blocks need be retransmitted, after a plurality of pages of documents have been transmitted.

The reception operation is now explained. The received data is written into the PMEM 23 through the line 40, CPU 30 and communication interface, and it is read from the PMEM 23 and stored in the hard disk 50. Since the hard disk cannot be taken out by the user and the contents thereof are not destroyed when the power supply is turned off, a reliability for storing the received data is high. The blocks 1, 2 and 4 are stored in the ASCII code and the block 3 is stored in the MMR code. The reception header is managed by the PMEM 23 so that the blocks can be edited on the cRT 60 or the IMEM 25.

Figure 5:
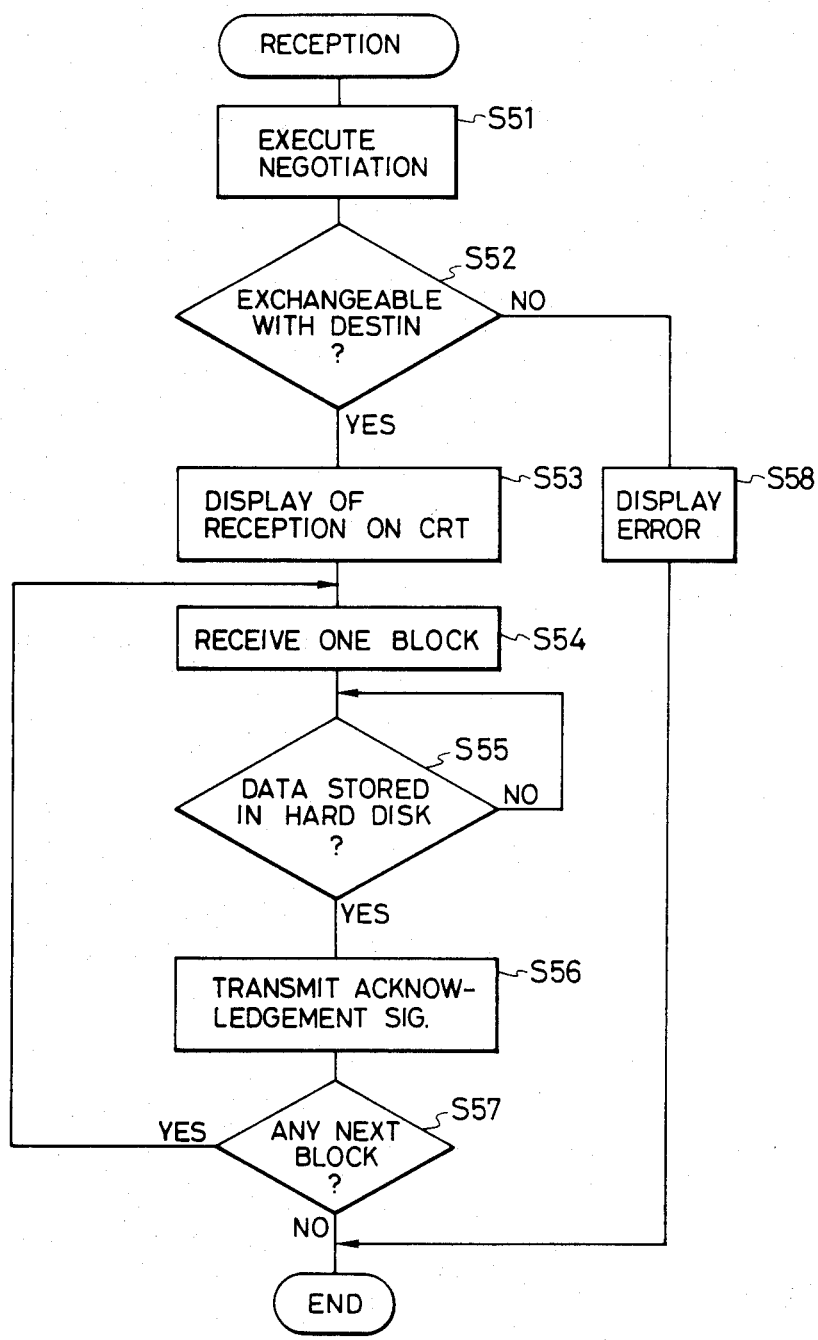
FIG. 5 is a flow chart of a receive operation in the embodiment of FIG. 1

FIG. 5 shows a flow chart of the receiving operation in the above embodiment.

Negotiation is started (S51) to check whether communication with the transmitting station is allowed to not (S52). If it is allowed, the reception mark and the terminal number and the communication class of the transmitting station are displayed on the CRT 60 (S53). The reception mark is displayed when the transmitting station is identified.

The reception mark is displayed during the edit operation at the bottom of the screen of the CRT 60 so that it does not disturb the edit operation, and the reception mark is made to blink.

If a call signal is received during the mixed edition operation of the character image and the reader image by using the BMU 24, IMEM 25, CRT 60, keyboard 61 and pointing device 62, the CPU 60 stores the received mixed data from the CCU 30 in the hard disk through the PMEM 23 by interruption and multi-task function without interrupting the mixed edition operation.

After one block of data has been received (S54), the data is stored in the hard disk. After the storage of one block of data has been confirmed (S55), the acknowledgment signal (which indicates that one block of data has been received) is sent to the transmitting station (S56). Whether another block remains to be transmitted or not is checked (S57), and if one is left, the storing in the hard disk and the transmission of the acknowledgment signal are repeated. On the other hand, if communication with the transmitting station is not allowed, an error indication or message is displayed (S58).

In this manner, the received data is stored in the hard disk one block at a time and then the acknowledgment signal is sent. Accordingly, the reliability of the received data is high.

Instead of sending the acknowledgment signal for each block, it may be sent for each window, each document or every plurality of n documents.

Thus, when one page of data has been received (S54), and the storage of one page of data to the disk 51 has been confirmed by the determination of EOP (S55) or the like, the acknowledgment signal which indicates that one page of data has been received is sent to the transmitting station (S56), whether another page is to be sent or not is checked by communication data (protocol) with the transmitting station and reception for each page of data is repeated (S57).

When a command signal which indicates the completion of the transmission of document of a plurality of pages of data has been received, all the reception operations are stopped.

Figure 6:
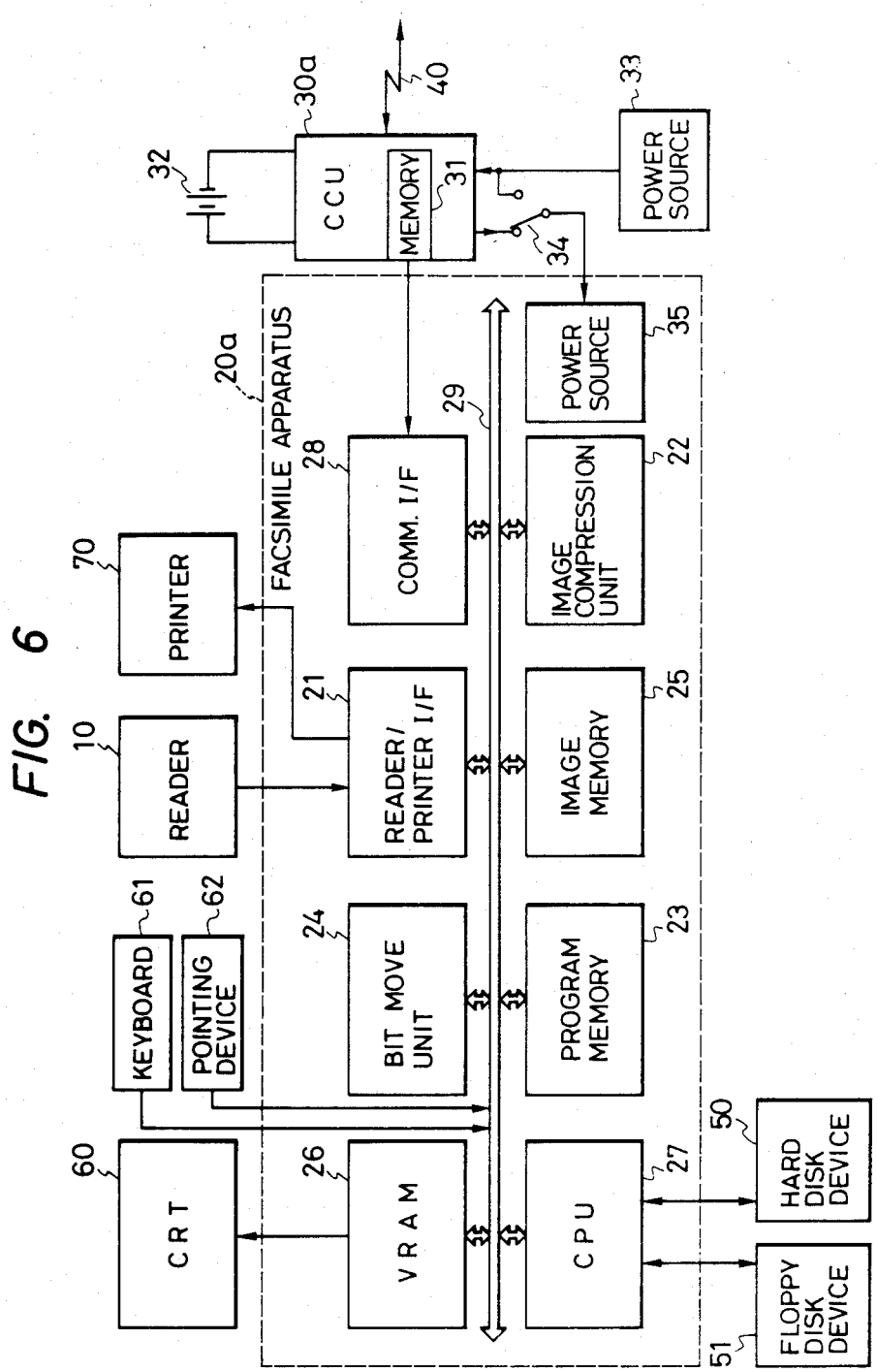
FIG. 6 is a block diagram of another embodiment of the present invention.

FIG. 6 is a block diagram of other embodiment of the present invention. The elements like to those shown in FIG. 1 are designated by like numerals.

In the present embodiment, a CCU 30a is provided in addition to a facsimile machine 20a to control a power supply 35 of the facsimile machine 20a.

The CCU 30a comprises a memory 31 for temporarily storing the received data and a battery 32 for preventing momentary power off. A power supply 33 is a main power supply and a second power supply 35 is a power control unit for the facsimile machine 20a.

When an auto-reception mode is not selected, a switch 34 is thrown to the right (the opposite position to that shown in FIG. 6). The operation in this case is essentially the same as that described in connection with FIG. 1.

In the auto-reception mode, the switch 34 is thrown to the left as shown in FIG. 6. In this case, since the CPU 30a does not supply power to the facsimile machine 20a, the hard disk drive 50 stops and an image appears on the CRT 60. Thus, energy can be saved particularly at night time when data is not received. Since the hard disk drive 50 stops during the non-reception period, the lifetime of the hard disk and the floppy disk is extended.

When a call signal is received from the transmitting station, the predetermined negotiation is carried out for a short time and then a timer is started and the memory 31 stores the received data. On the other hand, upon reception of the call signal, power is supplied from the power supply 35 to the elements of the facsimile machine 20 and the peripheral devices. After the hard disk 50 has become ready to store, the received data stored in the memory 31 is sent to the stored in the hard disk 50 as the timer is counter out. A reception mark is displayed on the screen of the CRT 60.

Thus, the reception of data is not delayed until the hard disk becomes ready, and line utilization efficiency is improved.

The operation when the data is sent from the mixed mode terminal device to the teletex or class 1 terminal device is now explained.

When the data is to be sent to the teletex terminal which receives the ASCII code and converts it to the character image, only the character codes are sent or the character codes and the message codes for the image blocks are sent.

The informaion from the mixed mode terminal is an entire page of information, an entire page of in its entire page, character information or mixed information. The mixed information is divided into a plurality of blocks marking up one page, and the blocks comprise at least one character information block and at least one image information block (FIG. 7).

When the image signal is to be sent to the teletex terminal, the block (or page) which contains the image information is erased and notice of the erasure is provided to an operator. If the operator requests a message for the erased image information, a message in the form of character is displayed in the block (or page) of the erased image information.

Finally, the text which consists of only character information of one page is transmitted without being block. If the message is not required, the image area is transmitted as a blank.

Figure 8:
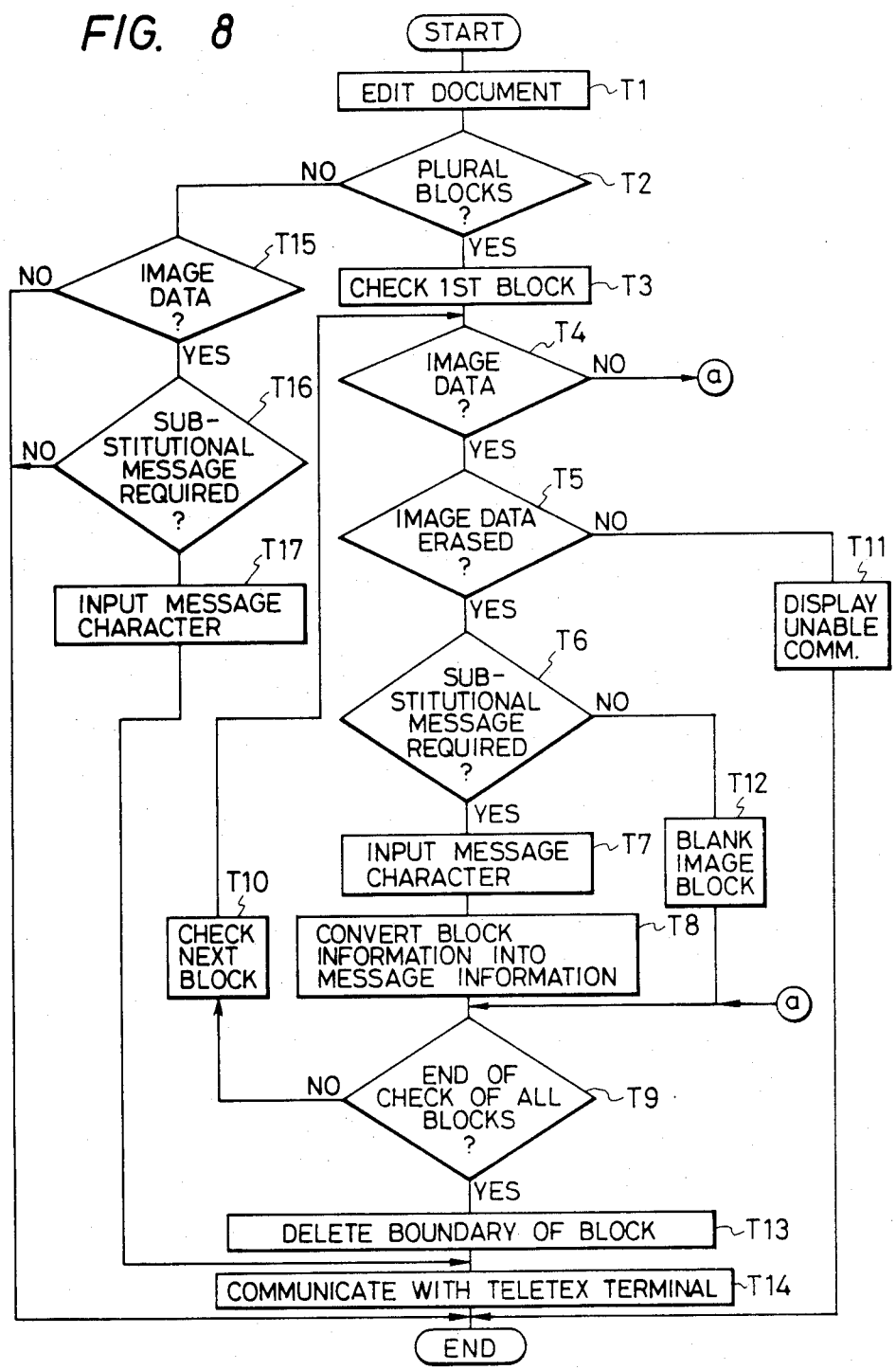
FIG. 8 is a flow chart of an operation for transmitting data from a mixed mode terminal to a teletex terminal.

FIG. 8 shows a flow chart of the transmission of data from the mixed mode terminal device to the teletex terminal device.

After the text edition (T1), whether one page, of edited information on the CRT screen has a plurality of blocks for the mixed mode or not is checked (T2). If it has a plurality of blocks, whether the first block includes image information or not is checked (T3, T4). The decision is made based on the identification code for each block (management data in the memory 23) added during the mixed editing.

If it is image information, whether the image information is to be erased or not is displayed on the CRT 60 (T5), and a command by the operator is monitored. If the erase command is entered, a command from the operator is monitored to determine whether an alternate message is to be sent or not (T6).

If the command to send the message is entered, the key data next entered is set to the message character (T7) and the image data block information is converted to the message information (T8). The block information may be either erased from the CRT screen or held.

The above operation is repeated for the remaining blocks (T9, T10).

On the other hand, if the block includes image character information, it is not erased but held on the CRT 60. If erasure of the image data is not desired, "communication not allowed" is displayed (T11), and if transmission of the alternate message is not desired, the image data block is left blank (T12).

After all blocks have been checked, boundaries of the blocks are deleted and the blocks are edited into one page of character information (T13), because the teletex terminal transmits and receives not block by block but page by page. The deletion of the boundaries corresponds to preparation of one page of code data map by scanning the block-by-block code data developed on the main memory 23 one page at a time from an initial address to the last address. As a result, the header for each block is deleted and an identification header C for one page is newly set (FIG. 12).

In the step T2, if the plurality of steps are not detected, and if image data is included (T15), whether the alternate message is necessary or not is checked (T16), and if it is necessary, the message character is entered (T17). If the image data is not included or if the image data is included but the alternate message is not necessary, the process is terminated.

Figure 9:
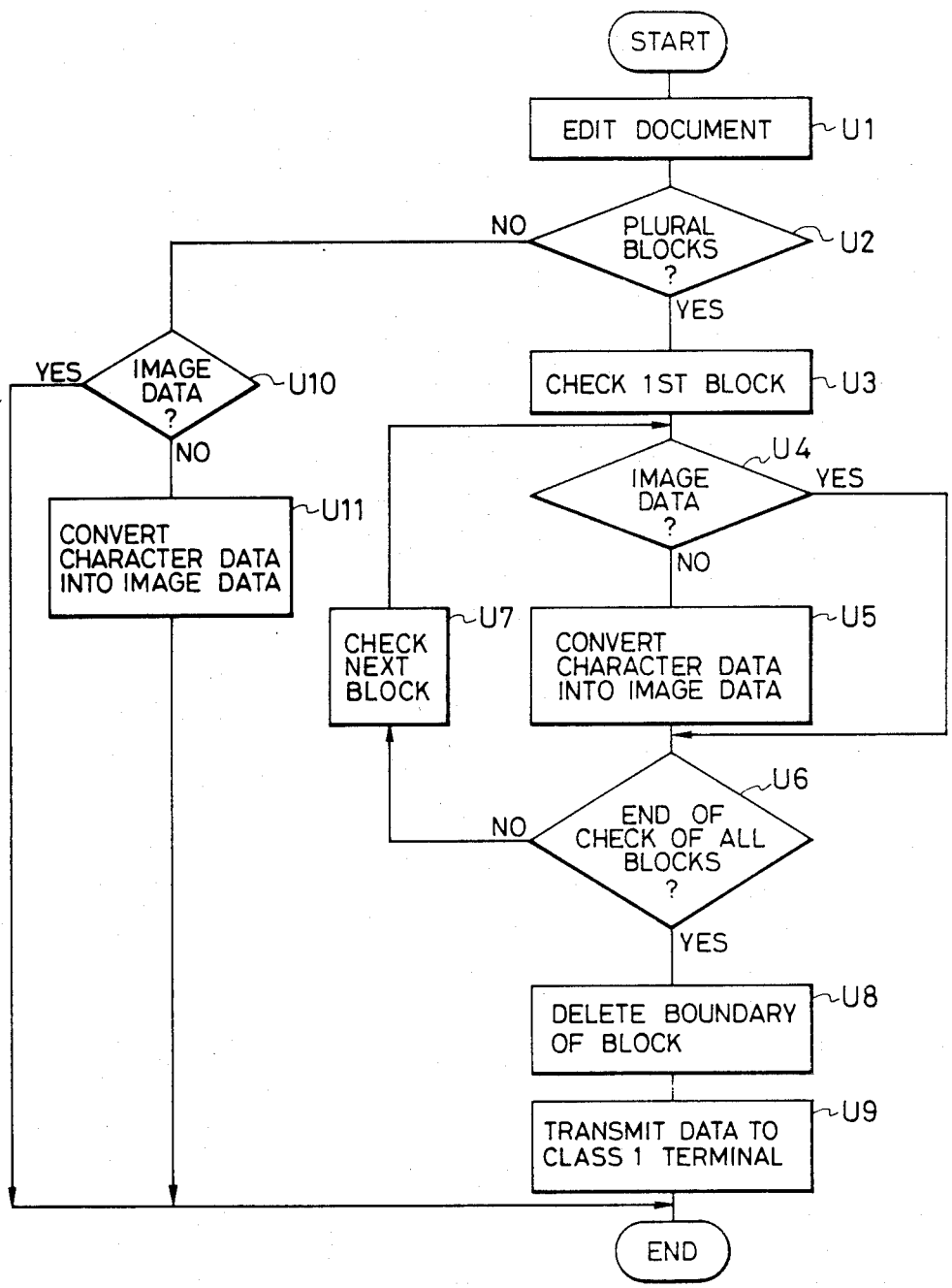
FIG. 9 is a flow chart of an operation for transmitting data from the mixed mode terminal to a class 1 terminal.

FIG. 9 shows a flow chart of the signal transmission from the mixed mode terminal device to the class 1 terminal device.

The process is basically the same as that shown in the flow chart of FIG. 8. The first three steps (U1–U3) are identical to those of FIG. 8. The image data is stored in the IMEM 25 so that it is sent as it is, and the character data is converted to the image data through the memory 23 and then it is stored in the IMEM 25 (U4, U5). The above operation is repeated for each of the blocks (U6, U7). Graphic code data is converted to image data for each block and it is stored in the IMEM 25.

Then, the block boundaries are deleted and the data is converted to one page of image information (U8) so that one page of bit data map can be prepared by scanning the pixel data for each block developed on the memory 25 from the initial address to the last address. The header for each block is thus deleted and the header I for one page is newly set (FIG. 12).

The data is sent to the class 1 terminal device (U9). If a plurality of blocks are not included, the page transmission is effected in the manner shown in FIG. 8 (U10, U11).

The density conversion is now explained. The resolution of the reader 10 and the printer 70 is as high as 16 pels/mm. The data in the facsimile machine 20 is compatible with 16 pels/mm. Accordingly, in a local mode in which the data read by the reader 10 is simply copied by the printer 70, the data resolution remains 16 pels/mm.

However, the destination station may be a terminal which can proess data at 8 pels/mm. In this case the data is converted to 8 pels/mm data in the transmission station so that the information quantity is less than that when the data is density-converted in the receiving station, and the transmission time is shorter.

Figure 10:
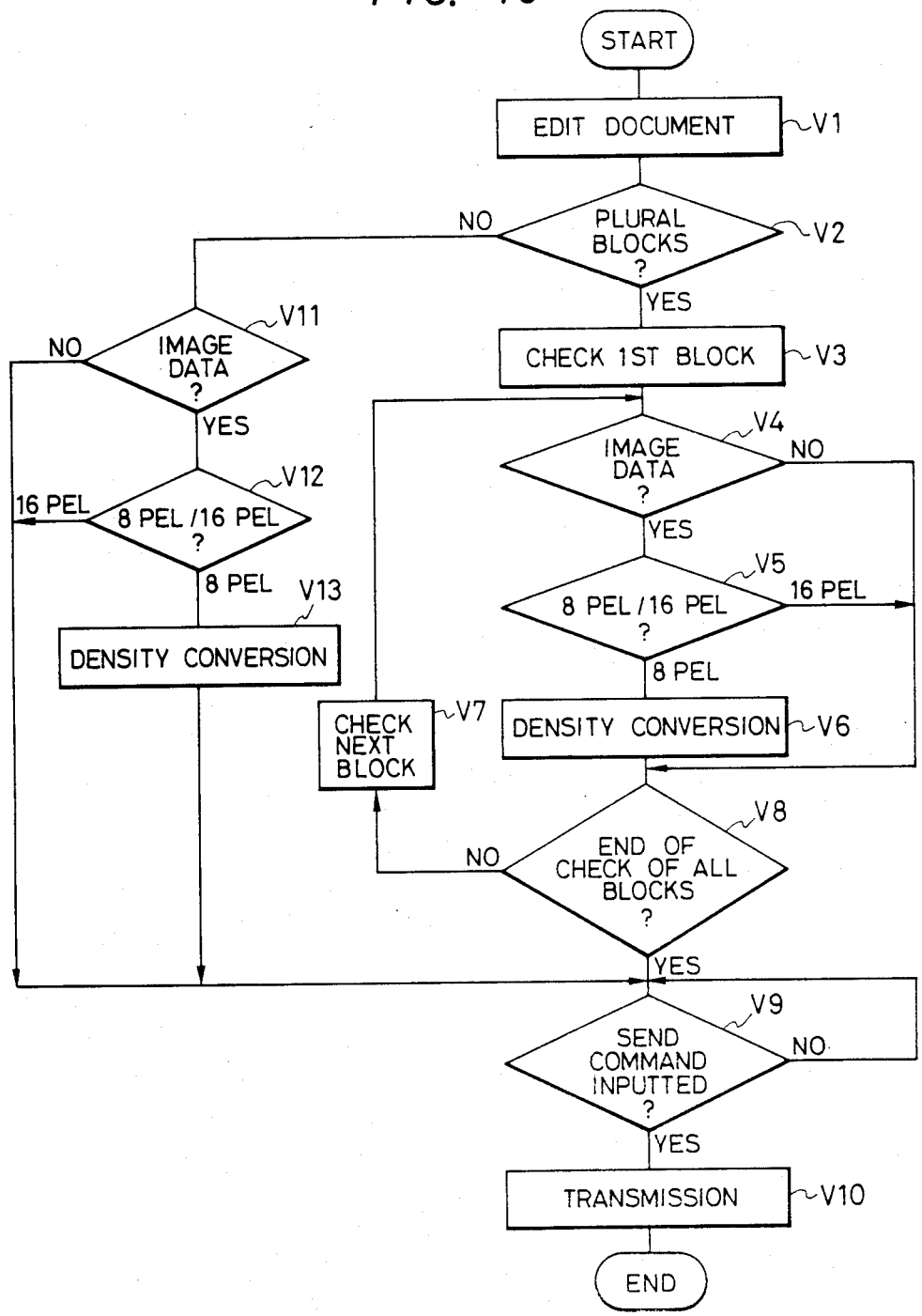
FIG. 10 is a flow chart of density conversion in the mixed mode.

FIG. 10 shows a flow chart of the density conversion in the mixed mode. The text is edited on the CRT 60 (V1), and whether one page of edited information has a plurality of blocks as shown in FIG. 7 or not is checked (V2). When the one page of read data includes image pixel data from the reader 10 and character code data from the keyboard (mixed data), the plurality of blocks are included. Accordingly, the first block is checked (V3), and whether it is the image data or the character data is checked in the same manner as FIG. 8 (V4). In the step V2, the one page of data to be checked may be the edited text data transferred from the hard disk to the IMEM 25.

If it is image data, whether the destination station is the 8 pels/mm terminal or the 16 pels/mm terminal is checked (V5). It is determined based on the terminal number of the destination station entered by the operator through the keyboard. More specifically, a table map memory of the terminal numbers and the density data (8 pels/mm data, 16 pels/mm data) is prepared and it is scanned to determine whether the terminal is 8 pels/mm or 16 pels/mm. The table map is preregistered in the ROM of the PMEM 23 as shown in FIG. 11.

If the transmission is to be done at 8 pels/mm, the density is reduced to one half (thinning of pixels) by the BMU 24 and the IMEM 25 and is stored in the disk 50 (V6). If the transmission is to be done at 16 pels/mm, no density conversion is made. The data may be converted to a density other than 8 pels/mm. In this case, the BMU 24 carries out a predetermined calculation to convert to the other density.

Then, the second block is checked (V7) and the above operation is repeated.

If the block includes character code data instead of image data, the density conversion is not performed, because it is advisable to transmit the text information in the form of code data such as originally edited ASCII code rather than to convert the character code data to the image pixel data and then density-convert it. However, when mixed data is to be transmitted to the class 1 terminal as shown in FIG. 9, the character code is converted to image pixel data and then it is density-converted. Since 8 pels are sufficient for the character image, 8-pel data may be sent without regard to the type of the destination station.

After all blocks have been checked (V8), whether a transmission command has been issued or not is checked (V9), and if it has been issued, the transmission is started (V10).

Thus, when the transmitting station processes high density data and the destination station processes low density data, the information quantity transmitted is reduced and the transmission time is shortened.

If all blocks have been checked in the step V8, the data to be transmitted has already been stored in the IMEM 25 or the hard disk 50 and the necessary density-conversion has been performed, but the transmission has not yet been initiated. Thus, the density-conversion is completed before the transmission. Accordingly, the density conversion time is not included in the transmission time and the transmission time is further shortened.

The density conversion prior to the transmission is attained by detecting the density of the destination station prior to the transmission by referring to the table map shown in FIG. 11. If the registration of the destination station is not found in the table, the density of the destination station can be detected during the communication negotiation (protocol dialogue) with the destination station, and the density conversion is performed after the line has been connected. In this case, the line is kept waiting for the density conversion time.

In the sep V2, if the edited text does not have the plurality of blocks, whether all data in the IMEM 25 are image data or not is checked (V11), and if they are image data, they are density-converted, and if they are character code data, they are transmitted without density conversion (V12, V13). If the destination station which received the character code data has a character generator in the font memory compatible to the resolution of the printer at the receiving station, the character pattern image of the corresponding resolution is generated in accordance with the codes transmitted.

The same is applicable to the above flow chart in which the character codes are substituted for by graphic codes (vector codes).

In the above flow chart, the last data to be transmitted is read from the hard disk. Accordingly, the image pixel data in the mixed data to which the density conversion and the message addition have been carried out is compressed by the ICU 22, and it is stored in the hard disk through the IMEM 25.

The image blocks and the character blocks to be transmitted from the hard disk have headers (identification codes) added before the data by the memory 23, and they are transmitted through the CPU 30 or 30a.

Figure 13:
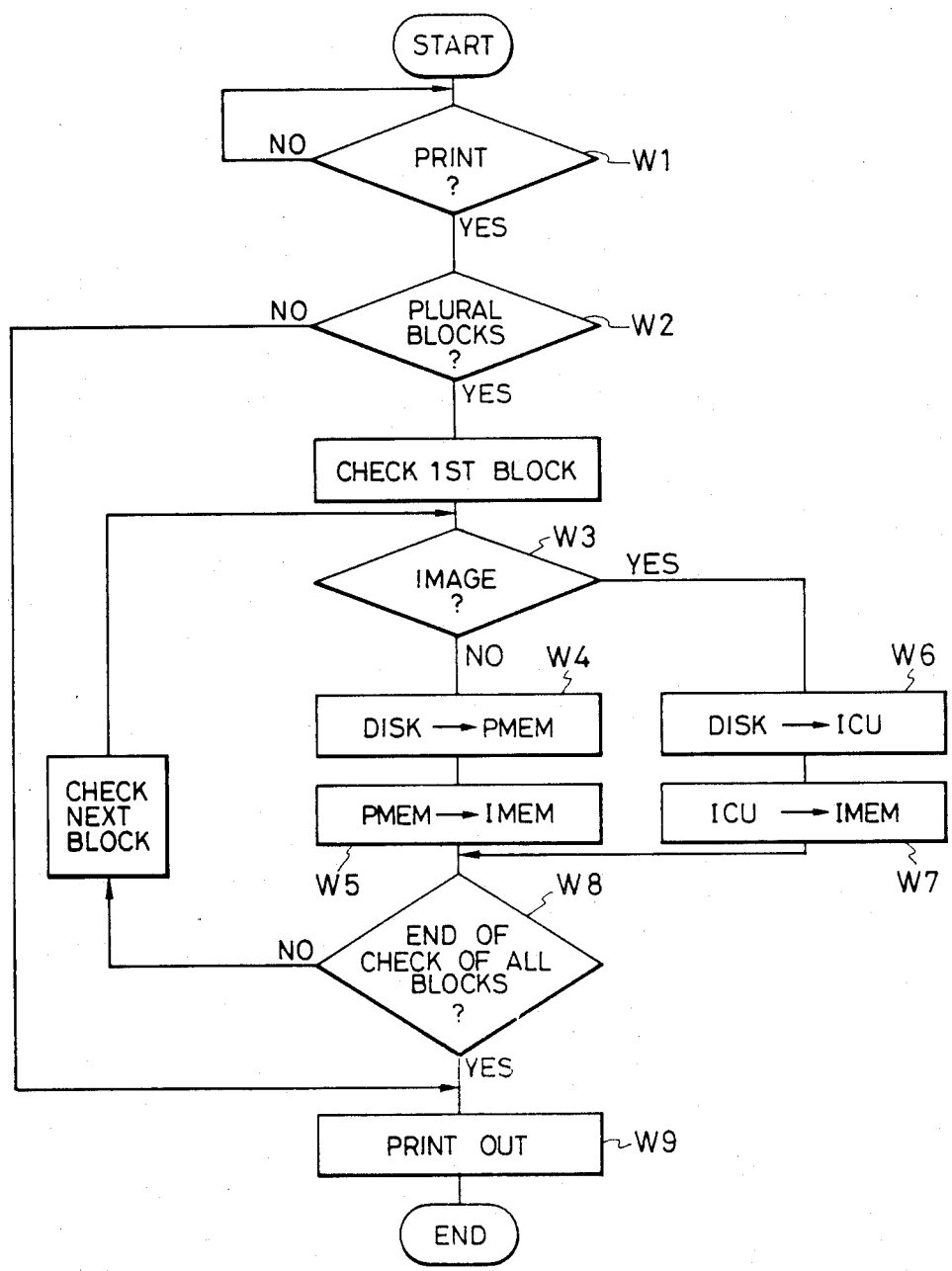
FIG. 13 is a flow chart of a print operation.
Figure 14A:
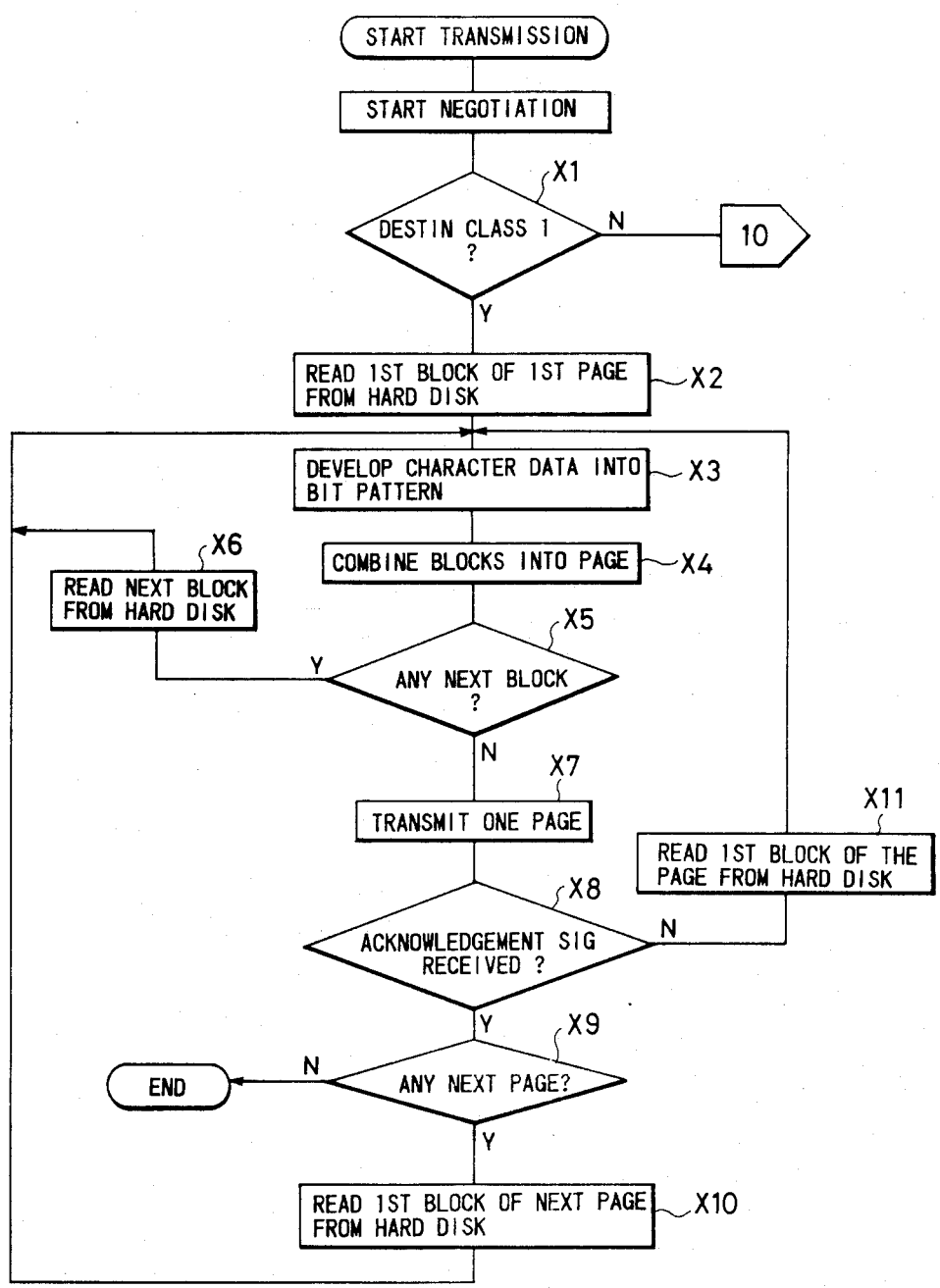
FIGS. 14A, 14B and 14C are a flow chart of an example of the acknowledgement for each page of document corresponding to one page of image shown in FIG. 7 between the transmission and the reception of one page of the document.
Figure 14B:
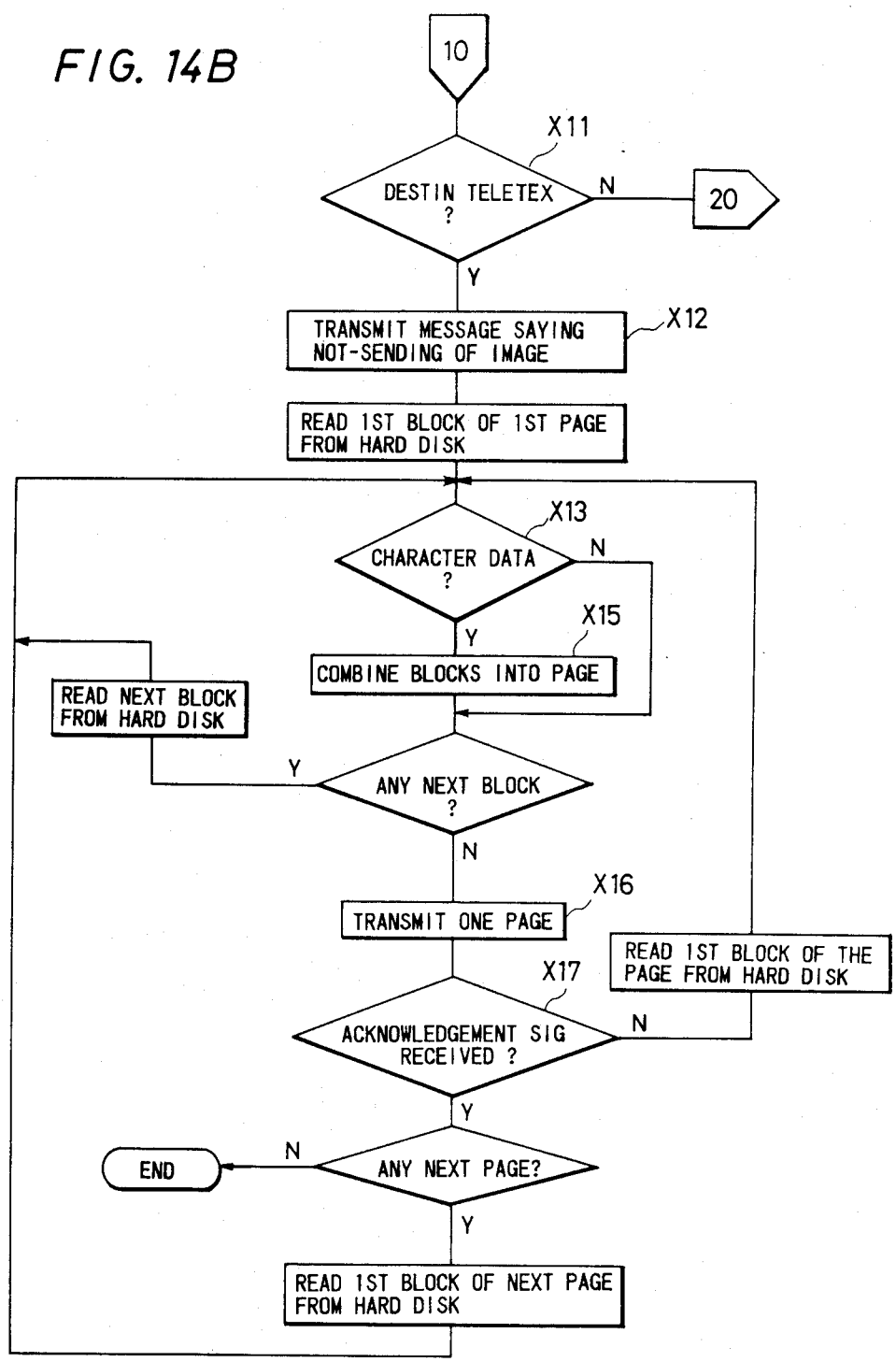
Figure 14C:
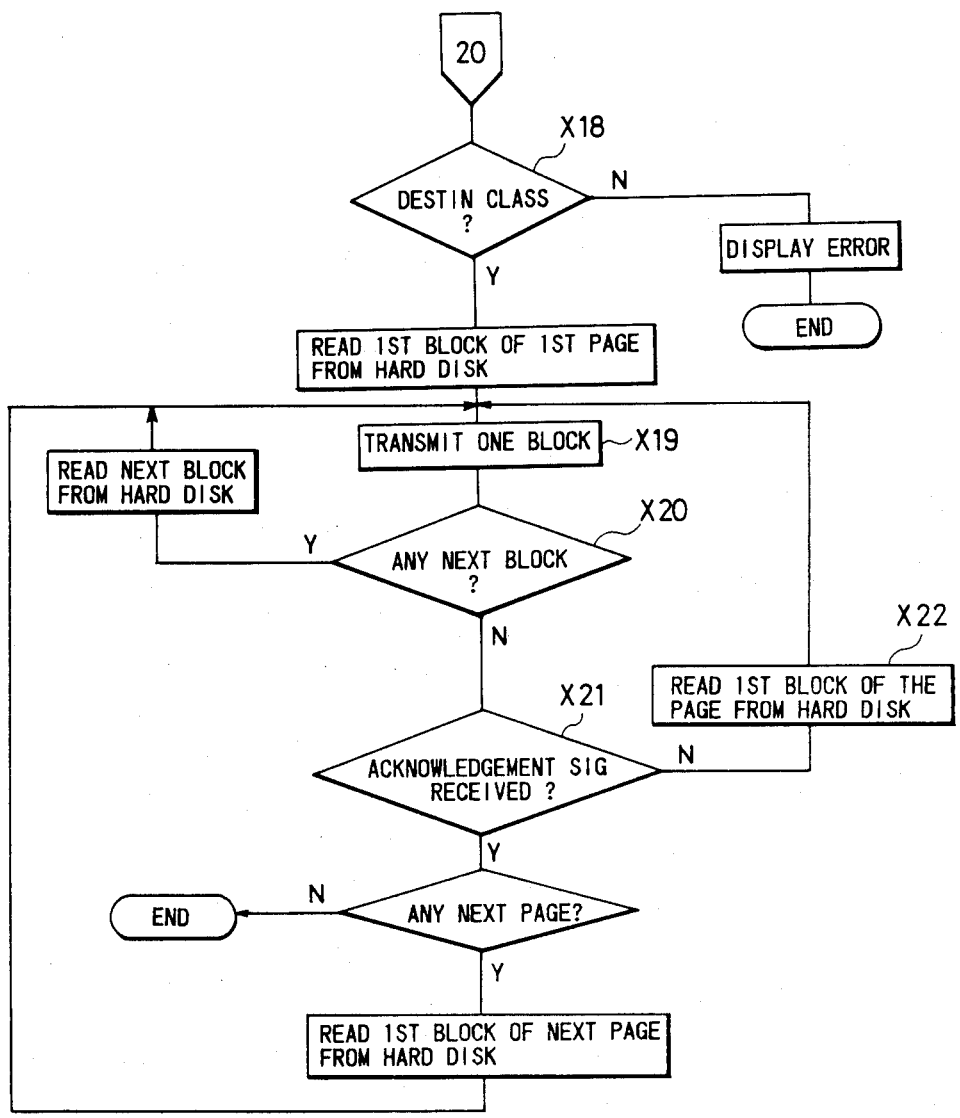

FIG. 13 shows a control flow chart for printing or displaying the received data. When an entry from a print key is detected (w1), whether the disk 50 includes a plurality of blocks of data or not is checked, and the type of the data of the first block is checked (w2, w3). This is determined based on the data of the reception header (stored in the management area of the disk 50). If it is character code data, the data of the first block is transferred to the PMEM 23, the ASCII code is converted to the image bit data, and it is transferred to the IMEM 25 at the position determined by the header data (w4, w5). If it is image data, it is transferred to the ICU 22 where it is decompressed and converted from the MMR code to the bit data, and it is transferred to the IMEM 25 at the position determined by the header (w6, w7).

After the conversion for all of the blocks, the data in the IMEM 25 is supplied to the printer 70 (w8, w9). In this manner, one page of mixed data can be printed out on one sheet. When the data is to be displayed on the CRT 60, the data are transferred from the IMEM 25 to the VRAM 26.

After input the transmission command, whether the type of the receiving station is class 1 or not is checked by the protocol data (XI). When the type of the receiving station is class 1, the first block data of one page is read from the disk 50 (X2) and the data is converted to a bit pattern data (X3), and then the bit pattern data is set to a designated position in ITEM 25 (X4). Whether there is another block in the page or not is checked by control data in the disk 51 (X5), and if a succeeding block is present, that block is read from the disk 50 (X6) and is converted to a bit pattern data, and the bit pattern data is set to another position in the ITME 25. The above steps are repeated and thus block composition is attained and one page of data is formed and stored in memory (X4). If no, one page of data in the memory 25 is compressed, converted and then transmitted as MMR encoded data by ICU 22, or the MMR encoded data of one page is stored in the disk 50 and is transmitted from the disk 51 (X7).

Reception of an acknowledgment signal from the destination station is checked (X8). If the acknowledgment signal is detected, whether another page data to be sent is left in the disk 51 or not is checked by control data (X9). If another block remains as mentioned above, each block data of the next page is sequentially read and is converted to a bit pattern data. Then, it is combined into one page of data and is transmitted. The above procedure cycle is repeated until no data to be sent is left in the disk 50.

If the acknowledgment signal of the reception is not detected, each block data of the present one page is sequentially read again from the disk 50 (X11), and is converted to a bit pattern (data). Then it is combined into one page of data and is transmitted.

Whether the destination station is a teletex station or not is checked (X11). If it is teletex, each block of one page is sequentially read from the disk 50 as well as the case of the class 1 of the teletex station. However, whether the read block data is character code data or not is checked by control data (X13). Only if it is character code, the code is arranged at a predetermined position in the memory 23. By combination of each character block, one page is formed in the memory 23 (X14). In a similar manner to that described above, after formation of one page, the transmission of the one page data (X16) and reception acknowledgment check (X17) for each page are repeated. Further, in advance a message stating that image data cannot be sent has been transmitted (X15).

Whether the receiving staton is a class 3 station or not is checked (X18). If it is a class 3 station, the first block of one page is read from the disk 50 and it is sent to the CCU 30 and the block data is transmitted (X19). The block data which is in the form of MMR code or ASCII code is sequentially transmitted in accordance with the type of each block. After completion of the transmission of each block in one page (X20), reception acknowledgement signal is checked (X21). If it is detected, as mentioned above, the reading of the next page and the transmission thereof are repeated. If it is not detected, the mixed page which was sent is read again and is resent (X22).

We claim:

1. A communication terminal device comprising:
    memory means for storing mixed data including image data and character code data in a page;
    sending means for sending data to be transmitted, said sending means being capable of sending, as block data, data divided into blocks in accordance with a type of data; and
    control means for discriminating terminal characteristics of a called station and converting the data stored in said memory means on the basis of the discrimination result,
    wherein said control means discriminates pixel density of image data receivable at the called station and converts the mixed data into image data having pixel density receivable at the called station, and said sending means sends the converted data.

2. A device according to claim 1, wherein said control means includes a table map memory storing information for data conversion associated with a plurality of called stations, and said control means performs data conversion on the basis of the information stored in the table map memory.

3. A device according to claim 1, wherein, when said control means discriminates that the called station cannot receive image data, said control means selects only character code data from the data to be transmitted and causes said sending means to send the data to be transmitted as one type of data without dividing the data into blocks.

4. A communication terminal device comprising:
memory means for storing mixed data including image data and character code data in a page;
sending means for sending data to be transmitted, said sending means being capable of sending, as block data, data divided into blocks in accordance with type of data; and
control means for discriminating terminal characteristics of a called station and converting the data stored in said memory means on the basis of a result of discrimination performed by said control means,
wherein, when said control means discriminates that the called station cannot receive mixed data, said control means converts the data into data receivable by the called station and said sending means sends the converted data, and
wherein, when said sending means sends, as block data, the data divided into blocks, said sending means sends the block data together with data employed to reproduce the block data.

5. A communication terminal device comprising:
memory means for storing mixed data including image data and character code data in a page;
sending means for sending data to be transmitted, said sending means being capable of sending, as block data, data divided into blocks in accordance with type of data;
control means for discriminating terminal characteristics of a called station and converting the data stored in said memory means on the basis of a result of discrimination performed by said control means, wherein, when said control means discriminates that the called station cannot receive mixed data, said control means converts the data into data receivable by the called station and said sending means sends the converted data; and
display means for displaying data stored in said memory means and receive means for receiving a calling signal from a calling station, wherein said display means displays information indicating reception of the calling signal during display of the data stored in said memory means.

6. A communication terminal device comprising:
memory means for storing mixed data including image data and character code data in a page;
sending means for sending data to be transmitted, said sending means being capable of sending, as block data, data divided into blocks in accordance with type of data; and
control means for discriminating terminal characteristics of a called station and converting the data stored in said memory means on the basis of a result of discrimination performed by said control means,
wherein, when said control means discriminates that the called station cannot receive mixed data, said control means converts the data into data receivable by the called station and said sending means sends the converted data;
wherein, when said control means discriminates that the called station cannot receive image data, said control means selects only character code data from the data to be transmitted and causes said sending means to send the data to be transmitted as one type of data without dividing the data into blocks; and wherein, when said control means discriminates that the called station cannot receive image data, said control means is adapted to issue a message indicating that image data cannot be sent.

7. A device according to claim 6, wherein said control means controls said sending mens to send the message to the called station.

8. A communication terminal device comprising:
memory means for storing mixed data including image data and character code data in a page;
sending means for sending data to be transmitted, said sending means being capable of sending, as block data, data divided into blocks in accordance with type of data; and
control means for discriminating terminal characteristics of a called station and converting the data stored in said memory means on the basis of a result of discrimination performed by said control means,
wherein, when said control means discriminates that the called station cannot receive mixed data, said control means converts the data into data receivable at the called station, and wherein after all the data to be transmitted is converted, said sending means sends the data.

9. A device according to claim 8, wherein said control means performs data conversion in relation to pixel density of the image data.

10. A data communication apparatus comprising:
memory means for storing mixed data including image data and character code data in a page;
sending means for sending data to be transmitted, said sending means being capable of sending, as block data, data divided into blocks in accordance with type of data; and
control means for discriminating terminal characteristics of a called station and converting the data stored in said memory means on the basis of a result of discrimination performed by said control means,
wherein said sending means sends the data adding separation data to each block; and wherein, when said control means discriminates that the called station cannot receive mixed data, said control means converts the data into data receivable at the called station and said sending means sends the data removing the separation data in dependence upon the converted data.

11. An apparatus according to claim 10, wherein, when said control means discriminates that the called station cannot receive character code data, said control means converts the character code data into image data and said sending means sends the data as image data without removing the separation data.

12. An apparatus according to claim 10, wherein, when said control means discriminates that the called station cannot receive image data, said control means selects only character code data from the data to be transmitted and said sending means sends the data as character code data removing the separation data.

13. A data communication apparatus comprising:
memory means for storing mixed data including image data and character code data in a page;
sending means for sending the data stored in said memory means; and
converting means for performing conversion of the data stored in said memory means n accordance with terminal characteristics of a called station;

wherein said sending means sends the data after completion of conversion of the data by said converting means.

14. An apparatus according to claim 13, wherein said converting means performs data conversion in relation to pixel density of the image data.

15. An apparatus according to claim 13, further comprising designating means for designating a called station, wherein said converting means includes a table map memory storing information for data conversion associated with a plurality of called stations, and wherein said converting means performs data conversion on the basis of the information for data conversion read out from the table map memory in association with a called station designated by said designating means.

16. An apparatus according to claim 15, wherein the information for data conversion stored in said table map memory is employed for data conversion in relation to pixel density of the image data, and said converting means performs data conversion in relation to pixel density of the image data on the basis of the information for pixel density conversion stored in said table map memory.

17. An apparatus according to claim 16, wherein density conversion of the image data said converting means performs data conversion in relation to piexel density of the image data.

* * * * *

UNITED STATES PATENT AND TRADEMARK OFFICE
CERTIFICATE OF CORRECTION

PATENT NO. : 4,827,349
DATED : May 2, 1989
INVENTOR(S) : MINORU OGATA ET AL.    Page 1 of 2

It is certified that error appears in the above-identified patent and that said Letters Patent is hereby corrected as shown below:

Title page:

AT REFERENCES CITED

U.S. Patent Documents, "Cameschi et al." should read --Caneschi et al.--.

COLUMN 4

Line 41, "key 61" should read --keyboard 61--.

COLUMN 5

Line 35, "black remain" should read --block remains--.

COLUMN 6

Line 28, "blicks" should read --blocks--.
Line 31, "14" should read --it--.

COLUMN 8

Line 4, "an image" should read --no image--.
Line 33, "information," should read --image information,-- and "in its entire" should be deleted.
Line 34, "page," should be deleted.

COLUMN 14

Line 67, "n" should read --in--.

UNITED STATES PATENT AND TRADEMARK OFFICE
CERTIFICATE OF CORRECTION

PATENT NO. : 4,827,349

DATED : May 2, 1989

INVENTOR(S) : MINORU OGATA ET AL.

Page 2 of 2

It is certified that error appears in the above-identified patent and that said Letters Patent is hereby corrected as shown below:

<u>COLUMN 16</u>

Lines 11-14, Claim 17 should be deleted.

Signed and Sealed this

Twentieth Day of March, 1990

*Attest:*

JEFFREY M. SAMUELS

*Attesting Officer*       *Acting Commissioner of Patents and Trademarks*